US005246621A

United States Patent [19]

Favre et al.

[11] Patent Number: 5,246,621

[45] Date of Patent: * Sep. 21, 1993

[54] BLEACH ACTIVATION BY MANGANESE-BASED COORDINATION COMPLEXES

[75] Inventors: Thomas L. F. Favre, Pijnacker; Ronald Hage, Leiden; Karin Van der Helm-Rademaker, Vlaardingen; Jean H. Koek, Vlaardingen; Rudolf J. Martens, Vlaardingen; Ton Swarthoff, Hellevoetsluis; Marten R. P. van Vliet, Haarlem, all of Netherlands

[73] Assignee: Lever Brothers Company, Division of Conopco, Inc., New York, N.Y.

[ * ] Notice: The portion of the term of this patent subsequent to Sep. 14, 2010 has been disclaimed.

[21] Appl. No.: 703,554

[22] Filed: May 21, 1991

[30] Foreign Application Priority Data

May 21, 1990 [GB] United Kingdom ................. 9011338

Dec. 18, 1990 [GB] United Kingdom ................. 9027415

[51] Int. Cl.[5] ......................... C01B 15/00; C09K 3/00

[52] U.S. Cl. .......................... 252/186.33; 252/186.42; 252/186.43; 252/186.25; 252/186.21; 252/95; 252/174.12

[58] Field of Search ...................... 252/186.21, 186.33, 252/186.22, 186.42, 186.43

[56] References Cited

U.S. PATENT DOCUMENTS 4,728,455 3/1988 Rerek .................................... 252/99

5,021,187 6/1991 Harriott et al. ............ 252/186.38 X 5,114,606 5/1992 Van Vliet et al. .............. 252/103 X 5,114,611 5/1992 Van Kralinger et al. ... 252/186.33 X

FOREIGN PATENT DOCUMENTS 0369841 5/1990 European Pat. Off. .

OTHER PUBLICATIONS

CA112(19): 177773m, Beck Warren F. et al. Dept. Chem., Yale University, USA.

CA105(26): 237364w, Wieghardt, Karl; Ruhr-University, Bochum D-4630 Fed. Rep. Germany.

J. Am. Chem. Soc. (Wieghardt et al.), 1988, vol. 110, pp. 7398–7411.

J. Chem. Soc., Chem. Soc., (Wieghardt et al.), 1988, pp. 1145–1146.

*Primary Examiner*—Richard D. Lovering

*Assistant Examiner*—Joseph D. Anthony

*Attorney, Agent, or Firm*—Honig, Milton L.

[57] ABSTRACT

Novel bleach and oxidation catalysts, a method of bleaching substrates using these catalysts and bleaching (detergent) compositions containing the catalysts are reported.

The catalysts are manganese complexes of formula:

$$[L_nMn_mX_p]^z Y_q$$

wherein Mn is manganese or iron or mixtures thereof, which can be in the II, III, IV or V oxidation state or mixtures thereof; n and m are independent integers from 1-4; X represents a co-ordination or bridging species; p is an integer from 0-12; Y is a counter-ion, the type of which is dependent upon the charge z of the complex which can be positive, zero or negative; q=z/[charge Y]; and L is a ligand being a macrocylic organic molecule.

17 Claims, No Drawings

BLEACH ACTIVATION BY MANGANESE-BASED COORDINATION COMPLEXES

This invention relates to activation of bleaches employing peroxy compounds, including hydrogen peroxide or a hydrogen peroxide adduct, which liberate hydrogen peroxide in aqueous solution, as well as peroxy acids; to compounds that activate or catalyse peroxy compounds; to bleach compositions including detergent bleach compositions which contain a catalyst for peroxy compounds; and to processes for bleaching and/or washing of substrates employing the aforementioned types of compositions.

In particular, the present invention is concerned with the novel use of transition metal compounds as improved catalyst for the bleach activation of peroxy compound bleaches.

Peroxide bleaching agents for use in laundering have been known for many years. Such agents are effective in removing stains, such as tea, fruit and wine stains, from clothing at or near boiling temperatures. The efficacy of peroxide bleaching agents drops off sharply at temperatures below 60° C.

It is known that many transition metal ions catalyse the decomposition of $H_2O_2$ and $H_2O_2$-liberating percompounds, such as sodium perborate. It has also been suggested that transition metal salts together with a chelating agent can be used to activate peroxide compounds so as to make them usable for satisfactory bleaching at lower temperatures. Not all combinations of transition metals with chelating agents appeared to be suitable for improving the bleaching performance of peroxide compound bleaches. Many combinations indeed show no effect, or even a worsening effect, on the bleaching performance; no proper rule seems to exist by which the effect of metal ion/chelating agent combinations on the bleaching performance of peroxide compound bleaches can be predicted.

All these prior art suggestions are based on systems in which free metal ion is the catalytically active species and consequently produce results in practice that are often very inconsistent and/or unsatisfactory, especially when used for washing at low temperatures.

For a transition metal to be useful as a bleach catalyst in a detergent bleach composition, the transition metal compound must not unduly promote peroxide decomposition by non-bleaching pathways and must be hydrolytically and oxidatively stable.

Hitherto the most effective peroxide bleach catalysts are based on cobalt as the transition metal.

The addition of catalysts based on the transition metal cobalt to detergent formulations is, however, a less acceptable route as judged from an environmental point of view.

In a number of patents the use of the environmentally acceptable transition metal manganese is described. All these applications are, however, based on the use of the free manganese ion and do not fulfil the requirement of hydrolytic stability. U.S. Pat. No. 4,728,455 discusses the use of Mn(III)-gluconate as peroxide bleach catalyst with high hydrolytic and oxidative stability; relatively high ratios of ligand (gluconate) to Mn are, however, needed to obtain the desired catalytic system. Moreover, the performance of these Mn-based catalysts is inadequate when used for bleaching in the low-temperature region of about 20°-40° C., and they are restricted in their efficacy to remove a wide class of stains.

We have now discovered a class of well-defined transition metal complexes which fulfil the demands of stability (both during the washing process and in the dispenser of the washing machine), and which are extremely active, even in the low-temperature region, for catalyzing the bleaching action of peroxy compounds on a wide variety of stains.

It is an object of the present invention to provide an improved transition metal catalyst for the bleach activation of oxidants, especially peroxy compounds, including hydrogen peroxide and hydrogen peroxide-liberating or -generating compounds, as well as peroxyacid compounds including peroxyacid precursors, over a wide class of stains at lower temperatures.

Another object of the invention is to provide an improved bleaching composition which is effective at low to medium temperatures of e.g. 10°-40° C.

Still another object of the invention is to provide new, improved detergent bleach formulations, which are especially effective for washing at lower temperatures.

Yet another object of the invention is to provide aqueous laundry wash media containing new, improved detergent bleach formulations.

A further object of the invention is to provide an improved bleaching system comprising a peroxy compound bleach and a transition metal catalyst for the effective use in the washing and bleaching of substrates, including laundry and hard surfaces (such as in machine dishwashing, general cleaning etc.), and in the textile, paper and woodpulp industries and other related industries.

These and other objects of the invention, as well as further understandings of the features and advantages thereof, can be had from the following description.

The present catalysts of the invention may also be applied in the peroxide oxidation of a broad range of organic molecules such as olefins, alcohols, aromatic ethers, sulphoxides and various dyes, and also for inhibiting dye transfer in the laundering of fabrics.

The improved transition metal bleach catalyst according to the invention is based on a non-cobalt metal and comprises preferably a manganese complex of the following formula (A):

$$[L_nMn_mX_p]^zY_q \qquad (A)$$

in which Mn is manganese, which can be either in the II, III, IV or V oxidation state, or mixtures thereof and wherein n and m are independent integers from 1-4; X represents a co-ordinating or bridging species, such as $H_2O$, $OH^-$, $O^{2-}$, $S^{2-}$,

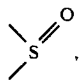, $N^{3-}$, $O_2^{2-}$, $O_2^{1-}$, R—$COO^-$, with R being H, alkyl, aryl, optionally substituted, $NR_3$ with R being H, alkyl, aryl, optionally substituted, $Cl^-$, $SCN^-$, $N_3^-$ etc. or a combination thereof; p is an integer from 0-12, preferably from 3-6; Y is a counter-ion, the type of which is dependent on the charge z of the complex; z denotes the charge of the complex and is an integer which can be positive, zero or negative. If z is positive, Y is an anion, such as $Cl^-$, $Br^-$, $I^-$, $NO_3$, $ClO_4^-$, $NCS^-$, $PF_6^-$, $RSO_4^-$; $OAc^-$, $BPh_4^-$, $CF_3SO_3^-$, $RSO_3^-$, $RSO_4^-$ etc; if z is negative, Y is a cation, such as an alkali metal, alkaline earth metal or (alkyl) ammonium cation etc; q=z/[charge Y]; and L is a ligand being a macrocylic organic molecule of general formula:

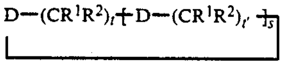

wherein $R^1$ and $R^2$ can each be zero, H, alkyl, aryl, optionally substituted, each D can be independently N, NR, PR, O or S, wherein R is H, alkyl, aryl, optionally substituted. If D=N, one of the hetero-carbon bonds attached thereto will be unsaturated, giving rise to a—$N=CR^1$—fragment, t and t' are each independently 2 or 3, and s=2, 3, 4 or 5.

In the above formula (A) of the complex, the co-ordinating or bridging species X is preferably a small co-ordinating ion or bridging molecule or a combination thereof, and the ligand L is preferably a macrocyclic organic molecule of the following general formula:

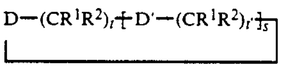

wherein $R^1$ and $R^2$ can each be zero, H, alkyl, or aryl, optionally substituted: D and D' are each independently N, NR, PR, O or S, wherein R is H, alkyl or aryl, optionally substituted; t and t' are each independently integers from 2-3; and s is an integer from 2-4. Preferably, n=m=2.

Alternatively, though less preferred, the catalyst can be an iron complex of similar formula (A) wherein Mn is replaced by Fe, which can also be either in the II, III, IV or V oxidation state or mixtures thereof.

Preferred ligands are those in which D or $D^1$ is NH or NR; t and t' are 2 or 3, s=2, and $R^1=R^2=H$, more preferably, wherein D or $D^1$ is $NCH_3$ and t, t'=2.

Other preferred ligands are those wherein D or $D^1$ is $NCH_3$; t, t'=2; s=2; and $R^1$ and $R^2$ can each be H or alkyl.

Examples of the ligands in their simplest forms are:

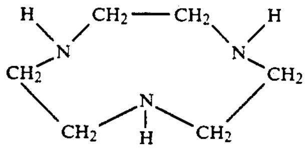

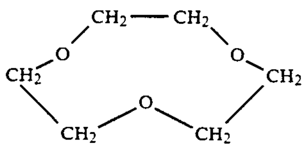

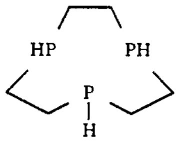 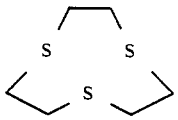

-continued

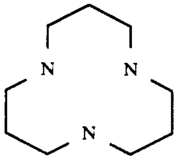 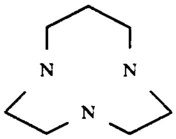

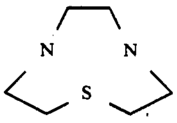 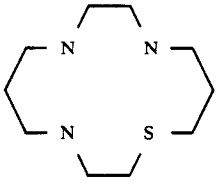

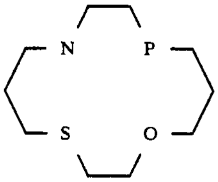 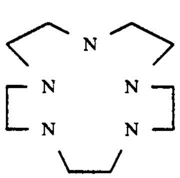

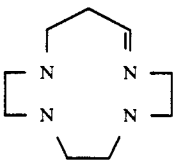

the preparation of which is well described in the chemical literature, e.g. Atkins et al "Organic Synthesis", 58, pages 86-98, 1978. Of these the most preferred ligands are:

I

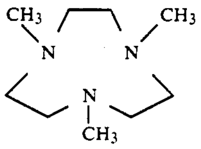

II

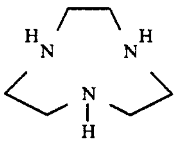

III

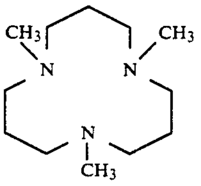

IV

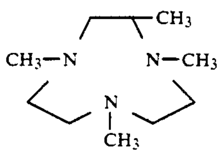

-continued

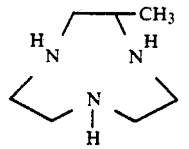

V

Ligand I is 1,4,7-trimethyl-1,4,7-triazacyclononane, coded as Me-TACN; ligand II is 1,4,7-triazacyclononane, coded as TACN; ligand III is 1,5,9-trimethyl-1,5,9-triazacyclododecane, coded as Me-TACD; ligand IV is 2-methyl-1,4,7-trimethyl-1,4,7-triazacyclononane, coded as Me/Me-TACN; and ligand V is 2-methyl-1,4,7-triazacyclononane, coded as Me/TACN. Ligands I and IV are particularly preferred.

Manganese complexes of these ligands, preformed or formed during the washing process, can be mono- or multinuclear. Depending on the type of ligand and the oxidation state of Mn, dinuclear or multinuclear Mn-complexes can be formed, in which the co-ordinating and/or bridging species X form bridges between the Mn centers.

Examples of some catalysts are:

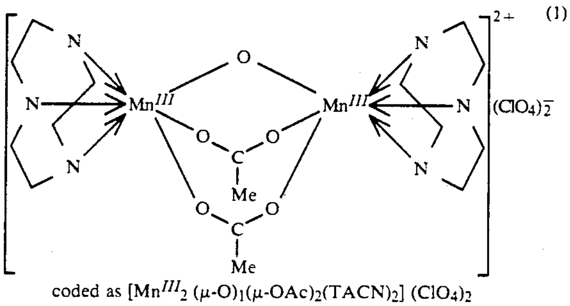

(1)

coded as $[Mn^{III}_2(\mu\text{-}O)_1(\mu\text{-}OAc)_2(TACN)_2](ClO_4)_2$

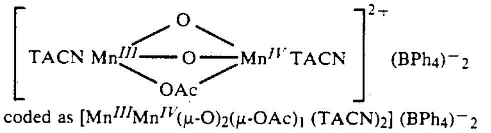

(2)

coded as $[Mn^{III}Mn^{IV}(\mu\text{-}O)_2(\mu\text{-}OAc)_1(TACN)_2](BPh_4)^-_2$

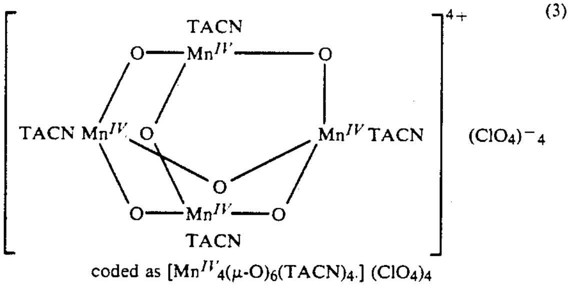

(3)

coded as $[Mn^{IV}_4(\mu\text{-}O)_6(TACN)_4](ClO_4)_4$

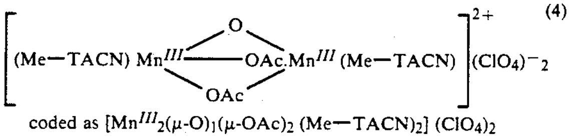

(4)

coded as $[Mn^{III}_2(\mu\text{-}O)_1(\mu\text{-}OAc)_2(Me\text{-}TACN)_2](ClO_4)_2$

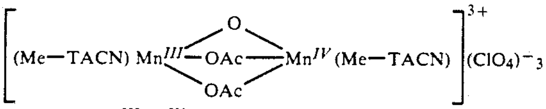

(5)

coded as $[Mn^{III}Mn^{IV}(\mu\text{-}O)_1(\mu\text{-}OAc)_2(Me\text{-}TACN)_2](ClO_4)_3$ -continued

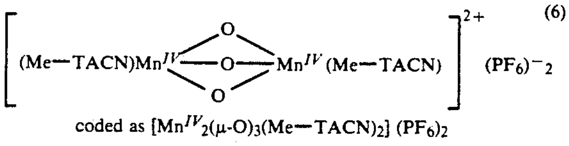

(6)

coded as $[Mn^{IV}_2(\mu\text{-}O)_3(Me\text{-}TACN)_2](PF_6)_2$

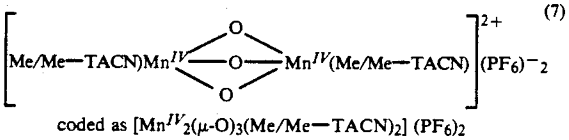

(7)

coded as $[Mn^{IV}_2(\mu\text{-}O)_3(Me/Me\text{-}TACN)_2](PF_6)_2$

Any of these complexes, either preformed or formed in situ during the washing process, are useful catalysts for the bleach activation of peroxy compounds over a wide class of stains at lower temperatures in a much more effective way than the Mn-based catalysts of the art hitherto known. Furthermore, these catalysts exhibit a high stability against hydrolysis and oxidation, even in the presence of oxidants such as hypochlorite. Preferred complexes are those of formulae (4), (5), (6) and (7), the most preferred complexes being (6) and (7).

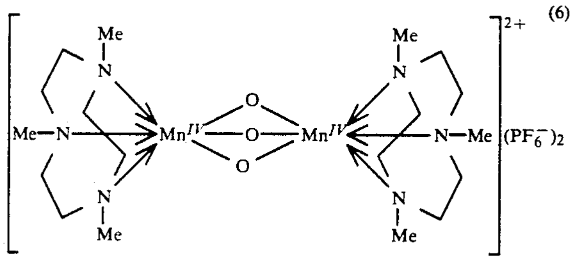

(6)

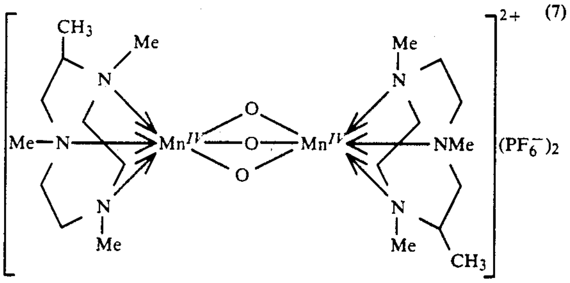

(7)

It should be noted that the catalytic activity is due to the $[L_nMn_mX_p]^z$ core complex and the presence of $Y_q$ has hardly any effect on the catalytic activity but it is present as a result of the method of preparation of the catalyst.

Several of the complexes described in this invention have been prepared previously as scientific and laboratory curiosities, e.g. as models for naturally occurring Mn-protein complexes without bearing any practical function in mind (K. Wieghardt et al., Journal of American Chemical Society, 1988, 110, page 7398 and references cited therein, and K. Wieghardt et al., Journal of the Chemical Society—Chemical Communications, 1988, page 1145).

The manganese co-ordination complexes usable as new bleach catalysts of the invention may be prepared and synthesized in manners as described in literature for several manganese complexes illustrated below:

PREPARATION OF $[Mn^{IV}_4(\mu\text{-}O)_6(TACN)_4](ClO_4)_4$

All solvents were degassed prior to use (to exclude all oxygen, which oxidizes $Mn^{II}$ to $Mn^{IV}$ and causes the formation of $Mn^{IV}O_2$). The reaction was carried out at room temperature, under argon atmosphere, unless otherwise stated.

In a 25 ml round-bottomed flask, equipped with a magnetic stirrer, 333 mg (2.58 mmol) 1,4,7-triazacyclononane was dissolved in 10 ml ethanol/water (85/15). This gave a clear, colourless solution (pH >11). Then 0.30 g (1.20 mmol) $Mn^{III}(OAc)_3$.2aq was added and a clear, dark-red solution was obtained. After the addition of 0.66 g (4.84 mmol) NaOAc.3aq, the pH fell to 8–9 and with about 10 drops of 70% $HCl_4$ solution, the pH of the reaction mixture was adjusted to 7–8. After the addition of 1.00 g (8.18 mmol) $NaClO_4$, black crystals precipitated. The reaction mixture was left to stand overnight. Then the precipitate was filtered over a glass filter, washed with ethanol/water (85/15) and dried in a dessicator over KOH. In the filtrate more crystals precipitated (shiny purple-black crystals). These crystals were no longer air-senstive.

SYNTHESIS OF $[Mn^{III}_2(\mu\text{-}O)_1(\mu\text{-}OAc)_2(Me\text{-}TACN)_2](ClO_4)_2.(H_2O)$ All solvents were degassed (first a vacuum was applied over the solvent for 5 minutes and subsequently argon gas was introduced; this was repeated three times) prior to use (to exclude all oxygen, which oxidizes $Mn^{II}$ to $Mn^{IV}$ and causes the formation of $Mn^{IV}O_2$).

The reaction was carried out at room temperature, under argon atmosphere, unless otherwise stated.

In a 25 ml round-bottomed flask, equipped with a magnetic stirrer, 500 mg (2.91 mmol) 1,4,7-trimethyl-1,4,7-triazacyclononane was dissolved in 15 ml ethanol/water (85/15). This gave a clear, colourless solution (pH>11). Then 0.45 g (1.80 mmol) $Mn^{III}$-$OAc_3$.2aq was added and a cloudy, dark-brown solution was obtained. After the addition of 1.00 g (7.29 mmol) NaOAc.3aq, the pH fell to 8 and with about 15 drops of 70% $HClO_4$ solution, the pH of the reaction mixture was adjusted to 5.0. After the addition of 1.50 g (12.24 mmol) $NaClO_4$, the colour of the reaction mixture changed from brown to red within about 30 minutes. After allowing the reaction mixture to stand for one week at room temperature, the product precipitated in the form of red crystals. Then the precipitate was filtered over a glass filter, washed with ethanol/water (85/15) and dried in a dessicator over KOH.

SYNTHESIS OF $[Mn^{III}Mn^{IV}(\mu\text{-}O)_1(\mu\text{-}OAc)_2(Me\text{-}TACN)_2](ClO_4)_3$ All solvents were degassed as described above, prior to use (to exclude all oxygen, which oxidizes $Mn^{II}$ to $Mn^{IV}$ and causes the formation of $Mn^{IV}O_2$). The reaction was carried out at room temperature, under argon atmosphere, unless otherwise stated.

In a 50 ml round-bottomed flask, equipped with a magnetic stirrer, 500 mg (2.90 mmol) 1,4,7-trimethyl-1,4,7-triazacyclononane was dissolved in 9 ml ethanol. This gave a clear, colourless solution (pH>11). Then 0.75 g (3.23 mmol) $Mn^{III}OAc_3$.2aq was added and a cloudy dark-brown solution was obtained. After the addition of 0.50 g (6.00 mmol) NaOAc.3aq and 10 ml water, the pH fell to 8. Then 1.0 ml 70% $HClO_4$ was added (pH 1), which started the precipitation of a brown powder that formed the product. The reaction mixture was allowed to stand for several hours at room temperature. Then the precipitate was filtered over a glass filter, washed with ethanol/water (60/40) and dried in a dessicator over KOH. In the filtrate no further precipitation was observed. The colour of the filtrate changed from green-brown to colourless in two weeks' time. Mn(III,IV)MeTACN is a green-brown microcrystalline product.

SYNTHESIS OF $[Mn^{IV}_2(\mu\text{-}O)_3(Me\text{-}TACN)_2](PF_6)_2$ $H_2O$

In a 50 ml round-bottomed flask, equipped with a magnetic stirrer, 661.4 mg of (4), i.e. $[Mn^{III}_2(\mu\text{-}O)_1(\mu\text{-}OAc)_2(Me\text{-}TACN)_2](ClO_4)_2$ (0.823 mmol crystals were pulverized, giving a purple powder) was dissolved in 40 ml of an ethanol/water mixture (1/1). After a five-minute ultrasonic treatment and stirring at room temperature for 15 minutes, all powder was dissolved, giving a dark-red-coloured neutral solution. 4 ml of triethylamine was added and the reaction mixture turned to dark-brown colour (pH>11). Immediately 3.55 g of sodium hexafluorophosphate (21.12 mmol, $NaPF_6$) was added. After stirring for 15 minutes at room temperature, in the presence of air, the mixture was filtered to remove some manganese dioxide, and the filtrate was allowed to stand overnight. A mixture of $MnO_2$ and red crystals was formed. The solids were collected by filtration and washed with ethanol). The red crystals (needles) were isolated by adding a few ml of acetonitrile to the filter. The crystals easily dissolved, while $MnO_2$, insoluble in acetonitrile, remained on the filter. Evaporation of the acetonitrile solution resulted in the product as red flocks.

An advantage of the bleach catalysts of the invention is that they are hydrolytically and oxidatively stable, and that the complexes themselves are catalytically active, and function in a variety of detergent formulations.

Another advantage is that, in many respects, the instant catalysts are better than any other Mn-complexes proposed in the art. They are not only effective in enhancing the bleaching action of hydrogen peroxide bleaching agents but also of organic and inorganic peroxyacid compounds.

A surprising feature of the bleach systems according to the invention is that they are effective on a wide range of stains including both hydrophilic and hydrophobic stains. This is in contrast with all previously proposed Mn-based catalysts, which are only effective on hydrophilic stains.

A further surprising feature is that they are compatible with detergent enzymes, such as proteases, cellulases, lipases, amylases, oxidases etc.

Accordingly, in one aspect, the invention provides a bleaching or cleaning process employing a bleaching agent selected from the group of peroxy compound bleaches including hydrogen peroxide, hydrogen peroxide-liberating or -generating compounds, peroxyacids and their salts, and peroxyacid bleach precursors and mixtures thereof, which process is characterized in that said bleaching agent is activated by a catalytic amount of a Mn-complex of general formula (A) as defined hereinbefore.

The catalytic component is a novel feature of the invention. The effective level of the Mn-complex catalyst, expressed in terms of parts per million (ppm) of manganese in the aqueous bleaching solution, will normally range from 0.001 ppm to 100 ppm, preferably from 0.01 ppm to 20 ppm, most preferably from 0.1 ppm to 10 ppm. Higher levels may be desired and applied in industrial bleaching processes, such as textile and paper pulp-bleaching. The lower range levels are primarily destined and preferably used in domestic laundry operations.

In another aspect, the invention provides an improved bleaching composition comprising a peroxy compound bleach as defined above and a catalyst for the bleaching action of the peroxy compound bleach, said catalyst comprising the aforesaid Mn-complex of general formulae (A).

As indicated above, the improved bleaching composition has particular application in detergent formulations to form a new and improved detergent bleach composition within the purview of the invention, comprising said peroxy compound bleach, the aforesaid Mn-complex catalyst, a surface-active material, and usually also detergency builders and other known ingredients of such formulations, as well as in the industrial bleaching of yarns, textiles, paper, woodpulp and the like.

The Mn-complex catalyst will be present in the detergent formulations in amounts so as to provide the required level in the wash liquor. When the dosage of the detergent bleach composition is relatively low, e.g. about 1 and 2 g/l by consumers in Japan and the USA, respectively, the Mn content in the formulation is 0.0025 to 0.5%, preferably 0.005 to 0.25%. At higher product dosage as used e.g. by European consumers, the Mn content in the formulation is 0.0005 to 0.1%, preferably from 0.001 to 0.05%.

Compositions comprising a peroxy compound bleach and the aforesaid bleach catalyst are effective over a wide pH range of between 7 and 13, with optimal pH range lying between 8 and 11.

The peroxy compound bleaches which can be utilized in the present invention include hydrogen peroxide, hydrogen peroxide-liberating compounds, hydrogen peroxide-generating systems, peroxyacids and their salts, and peroxyacid bleach precursor systems, and mixtures thereof.

Hydrogen peroxide sources are well known in the art. They include the alkali metal peroxides, organic peroxide bleaching compounds such as urea peroxide, and inorganic persalt bleaching compounds, such as the alkali metal perborates, percarbonates, perphosphates and persulphates. Mixtures of two or more of such compounds may also be suitable. Particularly preferred are sodium percarbonate and sodium perborate and, especially, sodium perborate monohydrate. Sodium perborate monohydrate is preferred to tetrahydrate because of its excellent storage stability while also dissolving very quickly in aqueous bleaching solutions. Sodium percarbonate may be preferred for environmental reasons. These bleaching compounds may be utilized alone or in conjunction with a peroxyacid bleach precursor. Use of this latter may be of advantage for improving the overall whiteness appearance of white fabrics as well as for hygiene purposes.

Peroxyacid bleach precursors are known and amply described in literature, such as in the GB Patents 836,988; 864,798; 907,356; 1,003,310 and 1,519,351; German Patent 3,337,921; EP-A-0185522; EP-A-0174132; EP-A-0120591; and U.S. Pat. Nos. 1,246,339; 3,332,882; 4,128,494; 4,412,934 and 4,675,393.

Another useful class of peroxyacid bleach precursors is that of the quaternary ammonium substituted peroxyacid precursors as disclosed in U.S. Pat. Nos. 4,751,015 and 4,397,757, in EP-A-284292, EP-A-331,229 and EP-A-03520. Examples of peroxyacid bleach precursors of this class are:

2-(N,N,N-trimethyl ammonium) ethyl-4-sulphophenyl carbonate—(SPCC);

N-octyl,N,N-dimethyl-N10-carbophenoxy decyl ammonium chloride—(ODC);

3-(N,N,N-trimethyl ammonium) propyl sodium-4-sulphophenyl carboxylate; and

N,N,N-trimethyl ammonium toluyloxy benzene sulphonate.

Of the above classes of bleach precursors, the preferred classes are the esters, including acyl phenol sulphonates and acyl alkyl phenol sulphonates; acylamides; and the quaternary ammonium substituted peroxyacid precursors.

Highly preferred activators include sodium-4-benzoyloxy benzene sulphonate; N,N,N',N'-tetraacetyl ethylene diamine; sodium-1-methyl-2-benzoyloxy benzene-4-sulphonate; sodium-4-methyl-3-benzoyloxy benzoate; SPCC; trimethyl ammonium toluyloxy benzene sulphonate; sodium nonanoyloxybenzene sulphonate; sodium 3,5,5,-trimethyl hexanoyloxybenzene sulphonate; glucose pentaacetate and tetraacetyl xylose.

Organic peroxyacids are also suitable as the peroxy compound. Such materials normally have a general formula:

$$HO-O-\overset{\overset{O}{\|}}{C}-R-Y$$

wherein R is an alkylene or substituted alkylene group containing from 1 to about 22 carbon atoms or a phenylene or substituted phenylene group, and Y is hydrogen, halogen, alkyl, aryl or $$-\overset{\overset{O}{\|}}{C}-OH \text{ or } -\overset{\overset{O}{\|}}{C}-O-OH$$

The organic peroxy acids usable in the present invention can contain either or two peroxy groups and can be either aliphatic or aromatic. When the organic peroxy acid is aliphatic, the unsubstituted acid has the general formula:

$$HO-O-\overset{\overset{O}{\|}}{C}-(CH_2)_n-Y$$

where Y can be, for example, H, $CH_3$, $CH_2Cl$, COOH, or COOOH; and n is an integer from 1 to 20.

When the organic peroxy acid is aromatic, the unsubstituted acid has the general formula:

$$HO-O-\overset{\overset{O}{\|}}{C}-C_6H_4-Y$$

wherein Y is hydrogen, alkyl, alkylhalogen, halogen, or COOH or COOOH.

Typical monoperoxy acids useful herein include alkyl peroxy acids and aryl peroxy acids such as:

(i) peroxybenzoic acid and ring-substituted peroxybenzoic acids, e.g. peroxy-o-naphthoic acid;

(ii) aliphatic, substituted aliphatic and arylalkyl monoperoxy acids, e.g. peroxylauric acid, peroxystearic acid, and N,N-phthaloylaminoperoxycaproic acid.

Typical diperoxy acids useful herein include alkyl diperoxy acids and aryldiperoxy acids, such as:
(iii) 1,12-diperoxydodecanedioic acid;
(iv) 1,9-diperoxyazelaic acid;
(v) diperoxybrassylic acid; diperoxysebacic acid and diperoxyisophthalic acid;
(vi) 2-decyldiperoxybutane-1,4-dioic acid;
(vii) 4,4'-sulfonylbisperoxybenzoic acid.

An inorganic peroxyacid salt usable herein is, for example, potassium monopersulphate.

A detergent bleach composition of the invention can be formulated by combining effective amounts of the components. The term "effective amounts" as used herein means that the ingredients are present in quantities such that each of them is operative for its intended purpose when the resulting mixture is combined with water to form an aqueous medium which can be used to wash and clean clothes, fabrics and other articles.

In particular, the detergent bleach composition can be formulated to contain, for example, from about 2% to 30% by weight, preferably from 5 to 25% by weight, of a peroxide compound.

Peroxyacids may be utilized in somewhat lower amounts, for example from 1% to about 15% by weight, preferably from 2% to 10% by weight.

Peroxyacid precursors may be utilized in combination with a peroxide compound in approximately the same level as peroxyacids, i.e. 1% to 15%, preferably from 2% to 10% by weight.

The manganese complex catalyst will be present in such formulations in amounts so as to provide the required level of Mn in the wash liquor. Normally, an amount of manganese complex catalyst is incorporated in the formulation which corresponds to a Mn content of from 0.0005% to about 0.5% by weight, preferably 0.001% to 0.25% by weight.

The bleach catalyst of the invention is compatible with substantially any known and common surface-active agents and detergency builder materials.

The surface-active material may be naturally derived, such as soap, or a synthetic material selected from anionic, nonionic, amphoteric, zwitterionic, cationic actives and mixtures thereof. Many suitable actives are commercially available and are described in literature, for example in "Surface Active Agents and Detergents", Volumes I and II, by Schwartz, Perry and Berch. The total level of the surface-active material may range up to 50% by weight, preferably being from about 1% to 40% by weight of the composition, most preferably 4 to 25%.

Synthetic anionic surface-actives are usually water-soluble alkali metal salts of organic sulphates and sulphonates having alkyl groups containing from about 8 to about 22 carbon atoms, the term alkyl being used to include the alkyl portion of higher aryl groups.

Examples of suitable synthetic anionic detergent compounds are sodium and ammonium alkyl sulphates, especially those obtained by sulphating higher ($C_8$–$C_{18}$) alcohols produced, for example, from tallow or coconut oil; sodium and ammonium alkyl ($C_9$–$C_{20}$) benzene sulphonates, particularly sodium linear secondary alkyl ($C_{10}$–$C_{15}$) benzene sulphonates; sodium alkyl glyceryl ether sulphates, especially those esters of the higher alcohols derived from tallow or coconut oil and synthetic alcohols derived from petroleum; sodium coconut oil fatty acid monoglyceride sulphates and sulphonates; sodium and ammonium salts of sulphuric acid esters of higher ($C_9$–$C_{18}$) fatty alcohol alkylene oxide, particularly ethylene oxide, reaction products; the reaction products of fatty acids such as coconut fatty acids esterified with isethionic acid and neutralized with sodium hydroxide; sodium and ammonium salts of fatty acid amides of methyl taurine; alkane monosulphonates such as those derived by reacting alpha-olefins ($C_8$–$C_{20}$) with sodium bisulphite and those derived by reacting paraffins with $SO_2$ and $Cl_2$ and then hydrolyzing with a base to produce a random sulphonate; sodium and ammonium $C_7$–$C_{12}$ dialkyl sulfosuccinates; and olefin sulphonates, which term is used to describe the material made by reacting olefins, particularly $C_{10}$–$C_{20}$ alpha-olefins, with $SO_3$ and then neutralizing and hydrolyzing the reaction product. The preferred anionic detergent compounds are sodium ($C_{11}$–$C_{15}$) alkylbenzene sulphonates, sodium ($C_{16}$–$C_{18}$) alkyl sulphates and sodium ($C_{16}$–$C_{18}$) alkyl ether sulphates.

Examples of suitable nonionic surface-active compounds which may be used, include in particular the reaction products of alkylene oxides, usually ethylene oxide, with alkyl ($C_6$–$C_{22}$) phenols, generally 5–25 EO, i.e. 5–25 units of ethylene oxides per molecule; the condensation products of aliphatic ($C_8$–$C_{18}$) primary or secondary linear or branched alcohols with ethylene oxide, generally 3–30 EO, and products made by condensation of ethylene oxide with the reaction products of propylene oxide and ethylene diamine. Other so-called nonionic surface-actives include alkyl polyglycosides, long chain tertiary amine oxides, long chain tertiary phosphine oxides and dialkyl sulphoxides.

Amounts of amphoteric or zwitterionic surface-active compounds can also be used in the compositions of the invention but this is not normally desired owing to their relatively high cost. If any amphoteric or zwitterionic detergent compounds are used, it is generally in small amounts in compositions based on the much more commonly used synthetic anionic and nonionic actives.

As stated above, soaps may also be incorporated in the compositions of the invention, preferably at a level of less than 25% by weight. They are particularly useful at low levels in binary (soap/anionic) or ternary mixtures together with nonionic or mixed synthetic anionic and nonionic compounds. Soaps which are used, are preferably the sodium, or, less desirably, potassium salts of saturated or unsaturated $C_{10}$–$C_{24}$ fatty acids or mixtures thereof. The amount of such soaps can be varied between about 0.5% and about 25% by weight, with lower amounts of about 0.5% to about 5% being generally sufficient for lather control. Amounts of soap between about 2% and about 20%, especially between about 5% and about 10%, are used to give a beneficial effect on detergency. This is particularly valuable in compositions used in hard water when the soap acts as a supplementary builder.

The detergent compositions of the invention will normally also contain a detergency builder. Builder materials may be selected from 1) calcium sequestrant materials 2) precipitating materials, 3) calcium ion-exchange materials and 4) mixtures thereof.

Examples of calcium sequestrant builder materials include alkali metal polyphosphates, such as sodium tripolyphosphate; nitrilotriacetic acid and its water-soluble salts; the alkali metal salts of ether polycarboxylates, such as carboxymethyloxy succinic acid, oxydisuccinic acid, mellitic acid; ethylene diamine tetraacetic acid; benzene polycarboxylic acids; citric acid; and polyacetal carboxylates as disclosed in U.S. Pat. Nos. 4,144,226 and 4,146,495.

Examples of precipitating builder materials include sodium orthophosphate, sodium carbonate and sodium carbonate/calcite. Examples of calcium ion-exchange builder materials include the various types of water-insoluble crystalline or amorphous aluminosilicates, of which zeolites are the best known representatives.

In particular, the compositions of the invention may contain any one of the organic or inorganic builder materials, such as sodium or potassium tripolyphosphate, sodium or potassium pyrophosphate, sodium or potassium orthophosphate, sodium carbonate or sodium carbonate/calcite mixtures, the sodium salt of nitrilotriacetic acid, sodium citrate, carboxymethyl malonate, carboxymethyloxy succinate and the water-insoluble crystalline or amorphous aluminosilicate builder materials, or mixtures thereof.

These builder materials may be present at a level of, for example, from 5 to 80% by weight, preferably from 10 to 60% by weight.

Apart from the components already mentioned, the detergent compositions of the invention can contain any of the conventional additives in the amounts in which such materials are normally employed in fabric washing detergent compositions. Examples of these additives include lather boosters, such as alkanolamides, particularly the monoethanol amides derived from palmkernel fatty acids and coconut fatty acids, lather depressants, such as alkyl phosphates and silicones, anti-redeposition agents, such as sodium carboxymethyl cellulose and alkyl or substituted alkyl cellulose ethers, other stabilizers, such as ethylene diamine tetraacetic acid and the phosphonic acid derivatives (i.e. Dequest® types), fabric softening agents, inorganic salts, such as sodium sulphate, and, usually present in very small amounts, fluorescent agents, perfumes, enzymes, such as proteases, cellulases, lipases, amylases and oxidases, germicides and colourants.

Another optional but highly desirable additive ingredient with multi-functional characteristics in detergent compositions is from 0.1% to about 3% by weight of a polymeric material having a molecular weight of from 1,000 to 2,000,000 and which can be a homo- or co-polymer of acrylic acid, maleic acid, or salt or anhydride thereof, vinyl pyrrolidone, methyl- or ethyl-vinyl ethers, and other polymerizable vinyl monomers. Preferred examples of such polymeric materials are polyacrylic acid or polyacrylate; polymaleic acid/acrylic acid copolymer; 70:30 acrylic acid/hydroxyethyl maleate copolymer; 1:1 styrene/maleic acid copolymer; isobutylene/maleic acid and diisobutylene/maleic acid copolymers; methyl- and ethyl-vinylether/maleic acid copolymers; ethylene/maleic acid copolymer; polyvinyl pyrrolidone; and vinyl pyrrolidone/maleic acid copolymer.

Detergent bleach compositions of the invention, when formulated as free-flowing particles, e.g. in powdered or granulated form, can be produced by any of the conventional techniques employed in the manufacture of detergent compositions, for instance by slurry-making, followed by spray-drying to form a detergent base powder to which the heat-sensitive ingredients including the peroxy compound bleach and optionally some other ingredients as desired, and the bleach catalyst, can be added as dry substances.

It will be appreciated, however, that the detergent base powder compositions, to which the bleach catalyst is added, can itself be made in a variety of other ways, such as the so-called part-part processing, non-tower route processing, dry-mixing, agglomeration, granulation, extrusion, compacting and densifying processes etc., such ways being well known to those skilled in the art and not forming the essential part of the present invention.

Alternatively, the bleach catalyst can be added separately to a wash/bleach water containing the peroxy compound bleaching agent.

In that case, the bleach catalyst is presented as a detergent additive product. Such additive products are intended to supplement or boost the performance of conventional detergent compositions and may contain any of the components of such compositions, although they will not comprise all of the components as present in a fully formulated detergent composition. Additive products in accordance with this aspect of the invention will normally be added to an aqueous liquor containing a source of (alkaline) hydrogen peroxide, although in certain circumstances the additive product may be used as separate treatment in a pre-wash or in the rinse.

Additive products in accordance with this aspect of the invention may comprise the compound alone or, preferably, in combination with a carrier, such as a compatible aqueous or non-aqueous liquid medium or a particulate substrate or a flexible non-particulate substrate.

Examples of compatible particulate substrates include inert materials, such as clays and other aluminosilicates, including zeolites, both natural and synthetic of origin. Other compatible particulate carrier materials include hydratable inorganic salts, such as carbonates and sulphates.

The instant bleach catalyst can also be formulated in detergent bleach compositions of other product forms, such as flakes, tablets, bars and liquids, particularly non-aqueous liquid detergent compositions.

Such non-aqueous liquid detergent compositions in which the instant bleach catalyst can be incorporated are known in the art and various formulations have been proposed, e.g. in U.S. Pat. Nos. 2,864,770; 3,368,977; 4,772,412; GB Patents 1,205,711; 1,370,377; 2,194,536; DE-A-2,233,771 and EP-A-0,028,849.

These are compositions which normally comprise a non-aqueous liquid medium, with or without a solid phase dispersed therein. The non-aqueous liquid medium may be a liquid surfactant, preferably a liquid nonionic surfactant; a non-polar liquid medium, e.g. liquid paraffin; a polar solvent, e.g. polyols, such as glycerol, sorbitol, ethylene glycol, optionally combined with low-molecular monohydric alcohols, e.g. ethanol or isopropanol; or mixtures thereof.

The solid phase can be builders, alkalis, abrasives, polymers, clays, other solid ionic surfactants, bleaches, fluorescent agents and other usual solid detergent ingredients.

The invention will now be further illustrated by way of the following non-limiting examples.

EXAMPLES

The experiments were either carried out in a temperature-controlled glass beaker equipped with a magnetic stirrer, thermocouple and a pH electrode, or under real washing machine conditions.

GLASS-VESSEL EXPERIMENTAL CONDITIONS

Most of the experiments were carried out at a constant temperature of 40° C.

In the experiments, demineralised water, hardened-up demineralised or tap water (16° FH) was applied. A Ca/Mg stock solution Ca:Mg=4:1 (weight ratio) was used to adjust water hardness.

In Examples, when formulations were used, the dosage amounted to about 6 g/l total formulation. The compositions of the base detergent formulations without bleach used are described below.

The amount of sodium perborate monohydrate was about 15%, yielding 8.6 mmol/l $H_2O_2$, calculated on 6 g/l dosage.

In most cases the catalysts were dosed at a concentration of between $10^{-6}$ to $10^{-5}$ mol Mn/l.

In experiments at 40° C. the initial pH was adjusted to 10.5.

Tea-stained cotton test cloth was used as bleach monitor. After rinsing in tap water, the cloths were dried in a tumble drier. The reflectance ($R_{460*}$) was measured before and after washing on a Zeiss Elrephometer. The average was taken of 2 values/test cloth.

DETERGENT FORMULATIONS WITHOUT BLEACH (%)

| | A | B | C | D | E |
|---|---|---|---|---|---|
| Anionic surfactant | 13 | 12 | 13 | 8 | 8 |
| Nonionic surfactant | 5 | 13 | 5 | 13 | 7 |
| Sodium triphosphate | 40 | — | — | — | — |
| Zeolite | — | 39 | — | 35 | 27 |
| Polymer | — | 6 | — | 5 | 5 |
| Sodium carbonate | — | 15 | 36 | 16 | 11 |
| Calcite | — | — | 24 | — | — |
| Sodium silicate | 8 | — | 7 | 1 | 1 |
| $Na_2SO_4$ | 20 | — | — | — | 23 |
| Savinase ® granule (proteolytic enzyme) | — | — | — | — | 1 |
| Water and minors | 14 | 15 | 15 | 22 | 17 |

EXAMPLE I

The bleach performance of some manganese catalysts of the invention is compared with that of other Co- and Mn-based catalysts.

Conditions: Glass-vessel experiments; no detergent formulation; demineralised water; T=40° C.; t=60 minutes; pH=10.5; $[H_2O_2]=8.6\times10^{-3}$ mol/l.

| Catalyst | Metal concentration mol/l | ΔR460* (15 min) | ΔR460* (60 min) |
|---|---|---|---|
| — | — | 1 | 7 |
| CoCo* | $12\times10^{-6}$ | 9 | 22 |
| $Mn^{II}(CF_3SO_3)_2$ | $6\times10^{-6}$ | 4 | 16 |
| $Mn^{III}$ gluconate | $5\times10^{-6}$ | 4 | 16 |
| $Mn^{IV}_4(\mu\text{-}O)_6(TACN)_4\text{-}(ClO_4)_4$ | $10\times10^{-6}$ | 6 | 19 |
| $Mn^{III}_2(\mu\text{-}O)_1(\mu\text{-}OAc)_2(Me\text{-}TACN)_2\text{-}(ClO_4)_2$ | $2.5\times10^{-6}$ | 14 | 29 |
| $Mn^{III}Mn^{IV}(\mu\text{-}O)_1(\mu\text{-}OAc)_2(Me\text{-}TACN)_2\text{-}(ClO_4)_3$ | $3.4\times10^{-6}$ | 16 | 31 |
| $Mn^{IV}_2(\mu\text{-}O)_3(Me\text{-}TACN)_2\text{-}(PF_6)_2$ | $3.7\times10^{-6}$ | 19 | 33 |

*CoCo is an abbreviation for 11,23-dimethyl-3,7,15,19-tetraazatricylo $[19.3.1.1.^{9,13}]$ hexacosa - 2,7,9,11,13 (26), 14,19,21 (25), 22,24-decaene-25,26-diolate-$Co_2Cl_2$ (described in EP-A-0408131).

The results clearly demonstrate the superior performance of the new Mn-catalysts over the system without catalysts and other Mn- and Co-based catalysts.

EXAMPLE II

In this Example the bleach performance of a manganese catalyst of the invention is compared with that of other manganese catalysts at the same concentration.

Conditions: Glass-vessel experiments; no detergent formulation; Demin. water, t=30 min., T=40° C., pH=10.5 and $[H_2O_2]=8.6\times10^{-3}$ mol/l.

| Catalyst | Mn-concentration mol/l | ΔR460 |
|---|---|---|
| — | — | 4 |
| $Mn^{II}Cl_2$ | $1.10^{-5}$ | 9 |
| $Mn^{III}$gluconate | $1.10^{-5}$ | 10 |
| Mn-sorbitol$_3$ | $1.10^{-5}$ | 11 |
| $Mn^{III}_2(\mu\text{-}O)_1(\mu\text{-}OAc)_2(Me\text{-}TACN)_2\text{-}(ClO_4)_2$ | $1.10^{-5}$ | 29 |

These results show the clearly superior bleach catalysis of the $Mn^{III}_2(\mu\text{-}O)_1(\mu\text{-}OAc)_2(Me\text{-}TACN)_2$ catalyst over the previously known Mn-based catalyst at the same manganese concentration.

EXAMPLE III

This Example shows the effects of $[Mn^{III}_2(\mu\text{-}O)_1(\mu\text{-}OAc)_2(Me\text{-}TACN)_2](ClO_4)_2$ catalyst concentration on the bleach performance.

Conditions : Glass-vessel experiments; no detergent formulation; T=40° C., t=30 minutes, pH=10.5, demin. water, and $[H_2O_2]=8.6\times10^{-3}$ mol/l.

| Mn-concentration in mol/l | ΔR460* |
|---|---|
| — | 4 |
| $10^{-7}$ | 8 |
| $10^{-6}$ | 17 |
| $2\times10^{-6}$ | 21 |
| $5\times10^{-6}$ | 26 |
| $10^{-5}$ | 29 |

The results show the strong catalytic effect already at a very low concentration and over a broad concentration range.

EXAMPLE IV

The bleach performance of different catalysts at 20° C. are compared.

Conditions: Glass-vessel experiments; no detergent formulation; Demin. water, T=20° C., t=60 minutes; pH 10.5; $[H_2O_2]=8.6\times10^{-3}$ mol/l, $[metal]=10^{-5}$ mol/l.

| Catalyst | ΔR 460* |
|---|---|
| — | 2 |

-continued

| Catalyst | ΔR 460* |
|---|---|
| Mn-sorbitol$_3$ | 3 |
| CoCo* | 7 |
| $Co^{III}(NH_3)_5Cl$** | 8 |
| $[Mn^{III}_2(\mu\text{-}O)_1(\mu\text{-}OAc)_2(Me\text{-}TACN)_2]\text{-}(ClO_4)_2$ | 20 |

CoCo* - for description see Example I.
$Co^{III}(NH_3)_5Cl$** - Cobalt catalyst described in EP-A-0272030 (Interox).

The above results show that the present catalyst still performs quite well at 20° C., at which temperature other known catalysts do not seem to be particularly effective.

EXAMPLE V

The bleach of the $Mn^{III}_2(\mu\text{-}O)_1(\mu\text{-}OAc)_2(Me\text{-}TACN)_2$ catalyst is shown as a function of temperature.

Conditions: Glass-vessel experiments; no detergent formulation; Demin. water, pH=10, t=20 minutes, $[Mn]=10^{-5}$ mol/l, $[H_2O_2]=8.6\times10^{-3}$ mol/l.

| | Catalyst | |
|---|---|---|
| | − | + |
| Temperature °C. | ΔR 460* | |
| 20 | 1 | 9 |
| 30 | 2 | 15 |
| 40 | 3 | 23 |
| 50 | 5 | 28 |
| 60 | 7 | 30 |

The results show that the catalyst is effective over a broad temperature range.

EXAMPLE VI

This Example shows the bleach catalysis of the $Mn^{III}_2(\mu\text{-}O)_1(\mu\text{-}OAc)_2(Me\text{-}TACN)_2$ catalyst in different powder formulations.

Conditions: Glass-vessel experiments; T=40° C.; t=30 minutes; pH=10.5; demin. water; dosage 6 g/l of detergent formulation incl. 14.3% perborate monohydrate; $[Mn]=2.3\times10^{-6}$ mol/l.

| | Catalyst | |
|---|---|---|
| Product Formulation | − | + |
| | ΔR 460* | |
| — | 4 | 21 |
| (A) | 4 | 13 |
| (B) | 4 | 22 |
| (C) | 3 | 18 |

From the above it is clear that the bleach catalysis can be obtained in very different types of formulations, e.g. with zeolite, carbonate and sodium triphosphate as builders.

EXAMPLE VII

The effect of $Mn^{IV}_2(\mu\text{-}O)_3(Me\text{-}TACN)_2$ on the stability of various detergent enzymes during the wash was examined.

Conditions: Glass-vessel experiments; 40° C.; 65 min.; 16° FH tap water; 5 g/l total dosage (detergent formulation D without or with 17.2% Na-perborate monohydrate (yielding $8.6\times10^{-3}$ mol/l $H_2O_2$); − or + catalyst at concentration $2.5\times10^{-6}$ mol/l; − or + enzyme, activity proteases ~95 GU/ml*, lipase ~3 LU/ml**.

The change of enzyme activity during the experiments is expressed as time-integrated activity fraction (t.i.a.f.), i.e. the ratio of the surfaces under the curve enzyme activity vs time (i.e. 65 min.) and under the theoretical curve enzyme activity vs time (i.e. 65 min.) if no enzyme deactivation would occur.

| | Bleaching performance ΔR 460* | | | Enzyme stability t.i.a.f. | | |
|---|---|---|---|---|---|---|
| | No bleach | Perborate | Perborate + cat. | No bleach | Perborate | Perborate + cat. |
| Savinase*** | 0 | 6 | 24 | 0.80 | 0.69 | 0.72 |
| Durazym*** | 0 | 7 | 25 | 0.88 | 0.85 | 0.77 |
| Esperase*** | 0 | 7 | 23 | 0.92 | 0.79 | 0.74 |
| Primase*** | 0 | 6 | 22 | 0.91 | 0.83 | 0.77 |
| Lipolase*** | 0 | 7 | 26 | 0.99 | 0.63 | 0.66 |

*This specification of glycine units (GU) is defined in EP 0 405 901 (Unilever).
**This specification of lipase units (LU) is defined in EP 0 258 068 (NOVO).
***Commercially available enzymes from NOVO NORDISK.

These figures show that the strong bleaching system of perborate+catalyst has no deleterious effect on the enzyme stability during the wash.

EXAMPLE VIII

The effect of $Mn^{IV}_2(\mu\text{-}O)_3(Me\text{-}TACN)_2$ on the bleaching performance of peracids and precursor/perborate systems. The precursors used in the experiments are N,N,N,',N'-tetraacetyl ethylene diamine (TAED) and SPCC.

VIII A

Conditions: Glass-vessel experiments; no detergent formulation present; 40° C.; 30 min.; pH 10.5; demin. water; $[cat]=2.5\times10^{-6}$ mol/l; $[peracid]=8\times10^{-3}$ mol/l.

| | Catalyst | |
|---|---|---|
| | − | + |
| | ΔR460* | |
| Peracetic acid | 9 | 20 |
| Sodium monopersulphate | 13 | 22 |

From these data it is clear that bleach catalysis is obtained with organic and inorganic peracid compounds.

VIII B

Conditions: Glass-vessel experiments; 40° C.; 30 min.; pH 10.0; 16° FH tap water; 6 g/l total dosage (detergent formulation D with 7.5/2.3/0.07% Na-perborate monohydrate/TAED/Dequest*® 2041; − or + $Mn^{IV}_2(\mu\text{-}O)_3(Me\text{-}TACN)_2$, $[cat]=2.5\times10^{-6}$ mol/l.

| Catalyst | − | + |
|---|---|---|

-continued

| | | |
|---|---|---|
| ΔR 460* | 6 | 20 |

This Example shows that the performance of a TAED/perborate bleaching system is also significantly improved by employing the catalyst.

VIII C

Conditions: Glass-vessel experiments; 20° C.; 30 min.; pH 10; 16° FH tap water; 6 g/l total dosage (detergent formulation D with 7.5/6.1% Na-perborate monohydrate/SPCC; − or + $Mn^{IV}_2(\mu\text{-}O)_3(Me\text{-}TACN)_2$; $[cat] = 2.5\times10^{-6}$ mol/l.

| Catalyst | − | + |
|---|---|---|
| ΔR 460* | 14 | 17 |

From these data it is clear that, even at 20° C., with a precursor (SPCC)/perborate bleaching system, a significant improvement of the bleach performance can be obtained.

EXAMPLE IX

This Example shows the bleach performance on different stains, i.e. under practical machine washing conditions as compared with the current commercial bleach system containing TAED (tetraacetyl ethylene diamine).

Conditions: Miele W 736 washing machine; 40° C. (nominal) short wash (17 min.) cycle: 6 min. at 39° C. max; 16° FH tap water; 3 kg medium-soiled cotton load including the bleach monitors; 100 g/run total dosage (detergent formulation E, either with 14.3% Na-perborate monohydrate + 0.04% $Mn^{III}Mn^{IV}(\mu\text{-}O)(\mu\text{-}OAc)_2(Me\text{-}TACN)_2$ or 7.5/2.3/0.24% Na-perborate monohydrate/TAED/Dequest 2041.

"Dequest" is a Trademark for polyphosphonates ex Monsanto.

| | Reflectance Values (ΔR 460*) | |
|---|---|---|
| STAIN | Current | Mn |
| EMPA 116 (blood/milk) | 10 | 12 |
| EMPA 114 (wine) | 22 | 26 |
| BC-1 (tea) | 1 | 10 |
| AS-10 (casein) | 26 | 28 |

| | Stain removal (lower figure is better result) | |
|---|---|---|
| | Current | Mn |
| Ketchup | 16.0 | 14.0 |
| Grass | 15.7 | 14.3 |
| Curry | 20.0 | 10.0 |

The results show that the catalyst of the invention performs better than the current TAED system on different test cloths and stains and that protease activity is not negatively affected (vide AS10 results).

EXAMPLE X

Hydrolytic stability of the catalysts of the invention is defined in terms of the water-solubility of the manganese at a pH of 10–11, in the presence of hydrogen peroxide, at a concentration of $1.7\times10^{-2}$ mol/l. A $10^{-3}$ molar solution of the Mn-complex is prepared, the pH is raised to 11 with 1 N NaOH, and hydrogen peroxide is added. The transparency at 800 nm is monitored for the next 2 hours by a UV/VIS spectrophotometer (Shimadzu).

If no significant decrease of transparency (or increase of adsorption) is observed, the complex is defined as hydrolytically stable.

| Sample | Hydrolytic stability |
|---|---|
| $[Mn^{IV}_4(\mu\text{-}O)_6(TACN)_4]\text{-}(ClO_4)_2$ | Yes |
| $[Mn^{III}_2(\mu\text{-}O)_1(\mu\text{-}OAc)_2(Me\text{-}TACN)_2]\text{-}(ClO_4)_2$ | Yes |
| $[Mn^{III}Mn^{IV}(\mu\text{-}O)_1(\mu\text{-}OAc)_2(Me\text{-}TACN)_2]\text{-}(ClO_4)_3$ | Yes |
| $[Mn^{IV}_2(\mu\text{-}O)_3(Me\text{-}TACN)_2]\text{-}(PF_6)_2$ | Yes |

From these data it can be seen that the new manganese catalysts meet the requirement of hydrolytic stability and are suitable for use according to the present invention.

EXAMPLE XI

Oxidative stability of the catalysts of the invention is defined in terms of water-solubility and homogeneity at a pH of 10 to 11, in the presence of strongly oxidizing agents such as hypochlorite. Oxidative stability tests are run with a $5.10^{-5}$ molar solution of the Mn-complex at a pH of 10 to 11. After addition of a similar volume of $10^{-3}$ molar hypochlorite, the transparency was measured as described hereinbefore (see Example X).

| Sample | Oxidative stability |
|---|---|
| $[Mn^{IV}_4(\mu\text{-}O)_6(TACN)_4]\text{-}(ClO_4)_4$ | Yes |
| $[Mn^{IV}_2(\mu\text{-}O)_3(Me\text{-}TACN)_2]\text{-}(PF_6)_2$ | Yes |

From the above data, it can be seen that both $Mn^{IV}$-complexes of the invention meet the requirements of oxidative stability as can happen in the presence of hypochlorite.

EXAMPLE XII

Dispenser stability of the catalysts of the invention is defined as stability against coloured manganese (hydr-)oxide formation in a wetted powder detergent formulation.

An amount of 3 mg of the catalyst is carefully mixed with 0.2 g of a product composed of 18 g detergent formulation B, 2.48 g Na-sulphate and 3.52 g Na-perborate monohydrate. Finally, 0.2 ml water is added to the mixture. After 10 minutes, the remaining slurry is observed upon discolourization.

| Sample | Stability |
|---|---|
| $[Mn^{IV}_4(\mu\text{-}O)_6(TACN)_4]\text{-}(ClO_4)_4$ | Yes |
| $[Mn^{IV}_2(\mu\text{-}O)_3(Me\text{-}TACN)_2]\text{-}(PF_6)_2$ | Yes |

We claim:

1. A bleaching composition comprising:

(i) a peroxy compound present in an effective amount to cause bleaching; and (ii) a catalyst present in an effective amount to activate the peroxy compound, the catalyst comprising a metal complex of formula (A):

$$[L_nMn_mX_p]^z\, Y_q \qquad (A)$$

wherein Mn is manganese which can be in an oxidation state selected from the group consisting of II, III, IV or V oxidation states and combinations thereof; n and m are independent integers from 1 to 4; X represents a coordination or bridging species; p is an integer from 0 to 12; Y is a counterion whose type is dependent upon the charge z of the complex; q=z/[charge Y]; and L is a ligand being a macrocyclic organic molecule of the general formula:

$$\overline{D-(CR^1R^2)_t-\![D-(CR^1R^2)_{t'}]_s}$$

wherein $R^1$ and $R^2$ are each independently optionally substituted radicals selected from the group consisting of hydrogen, alkyl, aryl and combinations thereof; t and t' are each independent integers selected from 2 and 3; each D can independently be selected from the group consisting of N, NR, PR, O and S, wherein R is an optionally substituted radical selected from the group consisting of hydrogen, alkyl and aryl; and s is an integer from 2 to 5.

2. A composition according to claim 1, wherein the catalyst is a complex selected from the group consisting of:

(i) $[Mn^{III}_2(\mu\text{-}O)_1(\mu\text{-}OAc)_2(Me\text{-}TACN)_2]$;
(ii) $[Mn^{III}Mn^{IV}(\mu\text{-}O)_1(\mu\text{-}OAc)_2(Me\text{-}TACN)_2]$;
(iii) $[Mn^{IV}_2(\mu\text{-}O)_3(\mu\text{-}OAc)_2$ ; and
(iv) $[Mn^{IV}_2(\mu\text{-}O)_3(Me/Me\text{-}TACN)_2]$.

3. A composition according to claim 1, further comprising from about 1% to 50% by weight of a surfactant.

4. A composition according to claim 1, which comprises said peroxy compound at a level of from 2 to 30% by weight and said catalyst at a level corresponding to a manganese content of from 0.005% to 0.5% by weight.

5. A composition according to claim 4, wherein said manganese content is from 0.001% to 0.25% by weight.

6. A composition according to claim 1, wherein said peroxy compound is selected from the group consisting of hydrogen peroxide, hydrogen peroxide-liberating compounds, hydrogen peroxide-generating systems, peroxyacids and their salts, and mixtures thereof.

7. A composition according to claim 6, wherein said peroxyacid is N,N-phthaloylaminoperoxycaproic acid.

8. A composition according to claim 6, which further comprises a surface-active material in an amount up to 50% by weight.

9. A composition according to claim 8, which further comprises a detergency builder in an amount of from 5 to 80% by weight.

10. A composition according to claim 6, which further comprises an enzyme selected from the group consisting of proteases, cellulases, lipases, amylases, oxidases and mixtures thereof.

11. A method for bleaching or cleaning of a substrate comprising contacting the substrate with a peroxy compound in an amount effective to accomplish the bleaching or cleaning and a catalyst present in an effective amount to activate the peroxy compound, the catalyst being a metal complex of formula (A):

$$[L_nMn_mX_p]^z\,Y_q \quad \text{(A)}$$

wherein Mn is manganese which can be in an oxidation state selected from the group consisting of II, III, IV, V oxidation states and combinations thereof; n and m are independent integers from 1 to 4; X represents a coordination or bridging species; p is an integer from 0 to 12; Y is a counterion whose type is dependent upon the charge z of the complex; q=z/[charge Y]; and L is a ligand being a macrocyclic organic molecule of the general formula:

$$\overline{D-(CR^1R^2)_t-\![D-(CR^1R^2)_{t'}]_s}$$

wherein $R^1$ and $R^2$ are each independently optionally substituted radicals selected from the group consisting of hydrogen, alkyl, aryl and combinations thereof; t and t' are each independent integers selected from 2 and 3; each D can independently be selected from the group consisting of N, NR, PR, O and S, wherein R is an optionally substituted radical selected from the group consisting of hydrogen, alkyl and aryl; and s is an integer from 2 to 5.

12. A method according to claim 11 wherein the substrate is selected from the group consisting of laundry, dishes, textiles, paper and wood pulp.

13. A method according to claim 11, wherein said catalyst is a manganese complex and used at a level of from 0.001 ppm to 100 ppm of manganese in an aqueous bleaching solution.

14. A method according to claim 13, wherein said level of manganese is from 0.01 to 20 ppm.

15. A method according to claim 11, wherein said bleaching agent is selected from the group consisting of hydrogen peroxide, hydrogen peroxide-liberating compounds, hydrogen peroxide-generating systems, peroxyacids and their salts, and mixtures thereof.

16. A method according to claim 15, wherein said peroxyacid is N,N-phthaloylaminoperoxycaproic acid.

17. A method according to claim 15, wherein the catalyst has a core complex selected from the group consisting of:

(i) $[Mn^{III}_2(\mu\text{-}O)_1(\mu\text{-}OAc)_2(Me\text{-}TACN)_2]$;
(ii) $[Mn^{III}Mn^{IV}(\mu\text{-}O)_1(\mu\text{-}OAc)_2(Me\text{-}TACN)_2]$;
(iii) $[Mn^{IV}_2(\mu\text{-}O)_3(\mu\text{-}OAc)_2$ ; and
(iv) $[Mn^{IV}_2(\mu\text{-}O)_3(Me/Me\text{-}TACN)_2]$.

* * * * *